United States Patent [19]
Gleichert et al.

[11] Patent Number: 5,387,911
[45] Date of Patent: Feb. 7, 1995

[54] METHOD AND APPARATUS FOR TRANSMITTING AND RECEIVING BOTH 8B/10B CODE AND 10B/12B CODE IN A SWITCHABLE 8B/10B TRANSMITTER AND RECEIVER

[76] Inventors: Marc C. Gleichert, 1191 Bretmoor Way, San Jose, Calif. 95129; Arthur Hsu, 763 Almondwood Way, San Jose, Calif. 95120; Yun-Che Wang, 278 Sylvia Dr., Los Altos, Calif. 94022

[21] Appl. No.: 839,864

[22] Filed: Feb. 21, 1992

[51] Int. Cl.6 .................................................. H03M 7/00
[52] U.S. Cl. ................................................. 341/95; 341/58
[58] Field of Search ............................ 341/55, 58, 95

[56]  References Cited
U.S. PATENT DOCUMENTS

| | | | |
|---|---|---|---|
| 4,387,364 | 6/1983 | Shirota | 341/55 |
| 4,486,739 | 12/1984 | Franaszek | 341/59 |
| 4,975,916 | 12/1990 | Miracle et al. | 371/47.1 |
| 5,047,768 | 9/1991 | Yamaguchi et al. | 341/95 |
| 5,095,484 | 3/1992 | Karabed et al. | 371/30 |
| 5,144,304 | 9/1992 | McMahon et al. | 341/58 |

FOREIGN PATENT DOCUMENTS 0097763  1/1984  European Pat. Off. .
2016247  9/1979  United Kingdom .

OTHER PUBLICATIONS

Intern. Jrl of Electronics, vol. 67 No. 3 Lond. GB. Sep. 1989, pp. 365–376.

*Primary Examiner*—Marc S. Hoff

[57]  ABSTRACT

A method and apparatus for using a modified 8B/10B system for transmitting 10 bit wide data packets in 12 bit code in which 5B/6B encoder/decoders separate the 10 bit wide data into two 5 bit nibbles. Unique special codes are provided which are not capable of aliasing with other 12 bit code words to provide reliable byte boundaries.

12 Claims, 4 Drawing Sheets

FIGURE_2

METHOD AND APPARATUS FOR TRANSMITTING AND RECEIVING BOTH 8B/10B CODE AND 10B/12B CODE IN A SWITCHABLE 8B/10B TRANSMITTER AND RECEIVER

FIELD OF THE INVENTION

This invention relates to methods and apparatus for coding data for high speed transmission and particularly to improvements to the 8B/10B code and apparatus.

BACKGROUND OF THE INVENTION

The so called 8B/10B code is one type of encoding for serial data transmission which has become standard for several high data rate applications to provide a maximum number of binary data transitions in order to maintain clock synchronization while at the same time maintaining a DC balance regardless of the incoming data pattern. DC balance means that the time averaged coded transmission is free of a dc level. DC balance simplifies transmitter and receiver design and improves precision of the system.

The 8B/10B code and equipment therefore accomplishes these objectives and are described in an article by Widmer et al entitled, "A DC-Balanced Partitioned-Block, 8B/10B Transmission Code," *IBM Journal of Research and Development*, Volume 27, 1983, pages 440–451.

Current 8B/10B transmitters are built with eight bit wide architecture. In fact the 8B/10B code and 8B/10B transmitter and receiver apparatus were particularly designed, as set forth by Widmer et al in the above mentioned article, for application with eight bit wide architecture. The Widmer approach codes an 8 bit raw data byte into 10 bits of encoded data by dividing said 8 bit wide data into two packets or nibbles, the first nibble being 5 bits and the second nibble being 3 bits. The 5 bit nibbles are fed to the 5B/6B encoder where they are encoded into 6 bit code and the 3 bit nibbles are sent to the 3B/4B encoder where they are encoded into a 4 bit code. From these encoders, both of the encoded nibbles are loaded into a single register and the 10 bit code packet is serially transmitted.

The 8B/10B code based systems have been highly successful. However, there are certain applications where 10 bit wide raw data is presented, notably video signal transmissions. In these instances, it is advantageous if the 10 bit byte can be handled as a packet.

In order to accomplish the benefits of our invention it was advantageous for us to provide special command codes which also comply with the criteria and rules of 8B/10B encodement. Accordingly, it is necessary to have an understanding of the concept of disparity and running disparity which are employed in the 8B/10B coding to understand the derivation of the special codes which we have added to the 8B/10B code in order to support its use in connection with 10 bit wide architecture.

As mentioned above, 8B/10B coding of an 8 bit byte is carried out in two nibbles, a 5 bit nibble and a 3 bit nibble. The 5 bit nibble is encoded to 6 bits and the 3 bit nibble is encoded to 4 bits. The 8B/10B coding is set forth in Table 1 and 2 as given below by Widmer. All the possible 5 bit data values are listed in column "ABCDE" and their corresponding valid 6 bit 5B/6B codes are listing in column labeled "abcdei" and in the column labeled "ALTERNATE." If the quantity called "running disparity" has a positive value immediately before the instant that the encoding of a particular raw data byte is to commence, then, the valid encoded data for that particular byte must be selected from the column of the Table which will not change the running disparity or will decrease it.

The term "running disparity" means the sum of the disparity of all previous blocks, where disparity is the difference between the number of ones and the number of zeroes in a block and is positive when the number of ones are greater. For any given nibble of 8B/10B coded data, the allowed disparity can be either +2, −2, or 0. With reference to Table 1, note that under column abcdei that each code in that column is selected so that the number of ones and zeroes in the code are either equal or differ by two. Also note that whenever a "+" appears in column D-1, that the number of zeroes exceeds the number of ones by two in the corresponding column "abcdei." Also note that whenever a "+" or "−" appear in the column D-1, that the complement code appears in the column ALTERNATE. This means that if the running disparity is "+", then the valid code for the next nibble should have more zeroes. Hence, the valid data must have a disparity of −2. If a "d" appears in column D-1, then the disparity is zero and the encoded form can be used with either value of prior running disparity.

The same characteristics apply for the 3B/4B encoding as shown in Table 2.

Using the 8B/10B codes of Tables 1 and 2, it is convenient to sum the disparity, i.e., +2, −2, or 0, for all codes sent to form the "running disparity" and if the running disparity is "+", to arrange the logic so that the disparity for the next coded nibble is negative. If the code indicated in column abcdei has a "+" preceding it, then it would be valid for the next coded nibble. However, if the code preceding the column abcdei is negative, then the code in the ALTERNATE column would need to be used. This would assure that the running disparity either flips back and forth from +1 to −1, or remains unchanged at −1 or +1 after each coded nibble is sent on.

TABLE 1

| | | 5B/6B ENCODING | | | | |
|---|---|---|---|---|---|---|
| NAME | ABCDE | K | D-1 | abcdei | DI | abcdei ALTERNATE |
| D.0  | 00000 | 0 | + | 011000 | − | 100111 |
| D.1  | 10000 | 0 | + | 100010 | − | 011101 |
| D.2  | 01000 | 0 | + | 010010 | − | 101101 |
| D.3  | 11000 | 0 | d | 110001 | 0 | |
| D.4  | 00100 | 0 | + | 001010 | − | 110101 |
| D.5  | 10100 | 0 | d | 101001 | 0 | |
| D.6  | 01100 | 0 | d | 011001 | 0 | |
| D.7  | 11100 | 0 | − | 111000 | 0 | 000111 |
| D.8  | 00010 | 0 | + | 000110 | − | 111001 |
| D.9  | 10010 | 0 | d | 100101 | 0 | |
| D.10 | 01010 | 0 | d | 010101 | 0 | |
| D.11 | 11010 | 0 | d | 110100 | 0 | |
| D.12 | 00110 | 0 | d | 001101 | 0 | |
| D.13 | 10110 | 0 | d | 101100 | 0 | |
| D.14 | 01110 | 0 | d | 011100 | 0 | |
| D.15 | 11110 | 0 | + | 101000 | − | 010111 |
| D.16 | 00001 | 0 | − | 011011 | + | 100100 |
| D.17 | 10001 | 0 | d | 100011 | 0 | |
| D.18 | 01001 | 0 | d | 010011 | 0 | |
| D.19 | 11001 | 0 | d | 110010 | 0 | |
| D.20 | 00101 | 0 | d | 001011 | 0 | |
| D.21 | 10101 | 0 | d | 101010 | 0 | |
| D.22 | 01101 | 0 | d | 011010 | 0 | |
| D/K.23 | 11101 | x | − | 111010 | + | 000101 |
| D.24 | 00011 | 0 | + | 001100 | − | 110011 |
| D.25 | 10011 | 0 | d | 100110 | 0 | |
| D.26 | 01011 | 0 | d | 010110 | 0 | |

TABLE 1-continued

5B/6B ENCODING

| NAME | ABCDE | K | D-1 | abcdei | DI | abcdei ALTERNATE |
|------|-------|---|-----|--------|----|------------------|
| D/K.27 | 11011 | x | — | 110110 | + | 001001 |
| D.28 | 00111 | 0 | d | 001110 | 0 | |
| K.28 | 00111. | 1 | — | 001111 | + | 110000 |
| D/K.29 | 10111 | x | — | 101110 | + | 010001 |
| D/K.30 | 01111 | x | — | 011110 | + | 100001 |
| D.31 | 11111 | 0 | — | 101011 | + | 010100 |

TABLE 2

3B/4B ENCODING

| NAME | FGH | K | D-1 | fghj | DI | fghj ALTERNATE |
|------|-----|---|-----|------|----|----------------|
| D/K.x.0 | 000 | x | + | 0100 | — | 1011 |
| D.x.1 | 100 | 0 | d | 1001 | 0 | |
| D.x.2 | 010 | 0 | d | 0101 | 0 | |
| D/K.x.3 | 110 | x | — | 1100 | 0 | 0011 |
| D/K.x.4 | 001 | x | + | 0010 | — | 1101 |
| D.x.5 | 101 | 0 | d | 1010 | 0 | |
| D.x.6 | 011 | 0 | d | 0110 | 0 | |
| D.x.P7 | 111 | 0 | — | 1110 | + | 0001 |
| D/K.y.A7 | 111 | x | — | 0111 | + | 1000 |
| K.28.1 | 100 | 1 | + | 1001 | 0 | 0110 |
| K.28.2 | 010 | 1 | + | 0101 | 0 | 1010 |
| K.28.5 | 101 | 1 | + | 1010 | 0 | 0101 |
| K.28.6 | 011 | 1 | + | 0110 | 0 | 1001 |

Note:
K.x Restricted to K.28
K.y Restricted to K.23, K.27, K.28, K.29, K.30

SUMMARY OF THE INVENTION

It is an objective of this invention to provide an inexpensive and convenient technique to use the 8B/10B code and 8B/10B apparatus for encoding 10 bit wide data packets into 12 bit code.

It is a further objective to provide a modified 8B/10B transmitter which is capable of operating both in 8B/10B mode and in a mode that we call 10B/12B for coding 10 bit wide data into 12 bit coded.

It is still further an objective to provide an 8B/10B receiver which is capable of operating in both 8B/10B mode and in 10B/12B mode responsive to control signals or to the mode which was used to encode the data being received.

These objectives are provided by designing a 10B/12B code system employing both special unique 10B/12B codes and the 5B/6B codes used in the 8B/10B system and by modifying the 8B/10B transmitter and receiver to operate in both the 8B/10B mode and in our 10B/12B mode.

One feature of our invention is to separate 10 bit raw data into two 5 bit nibbles and to code this data using the 5B/6B codes of the 8B/10B system.

A further feature of our invention is to provide two unique special character codes which are not capable of being formed by aliasing with other valid data.

A further feature of our invention is to provide a single exclusive OR circuit to cause the selection of ALTERNATE code after the encoded data is serialized for transmission.

DETAILED DESCRIPTION OF THE INVENTION

Figure 1:
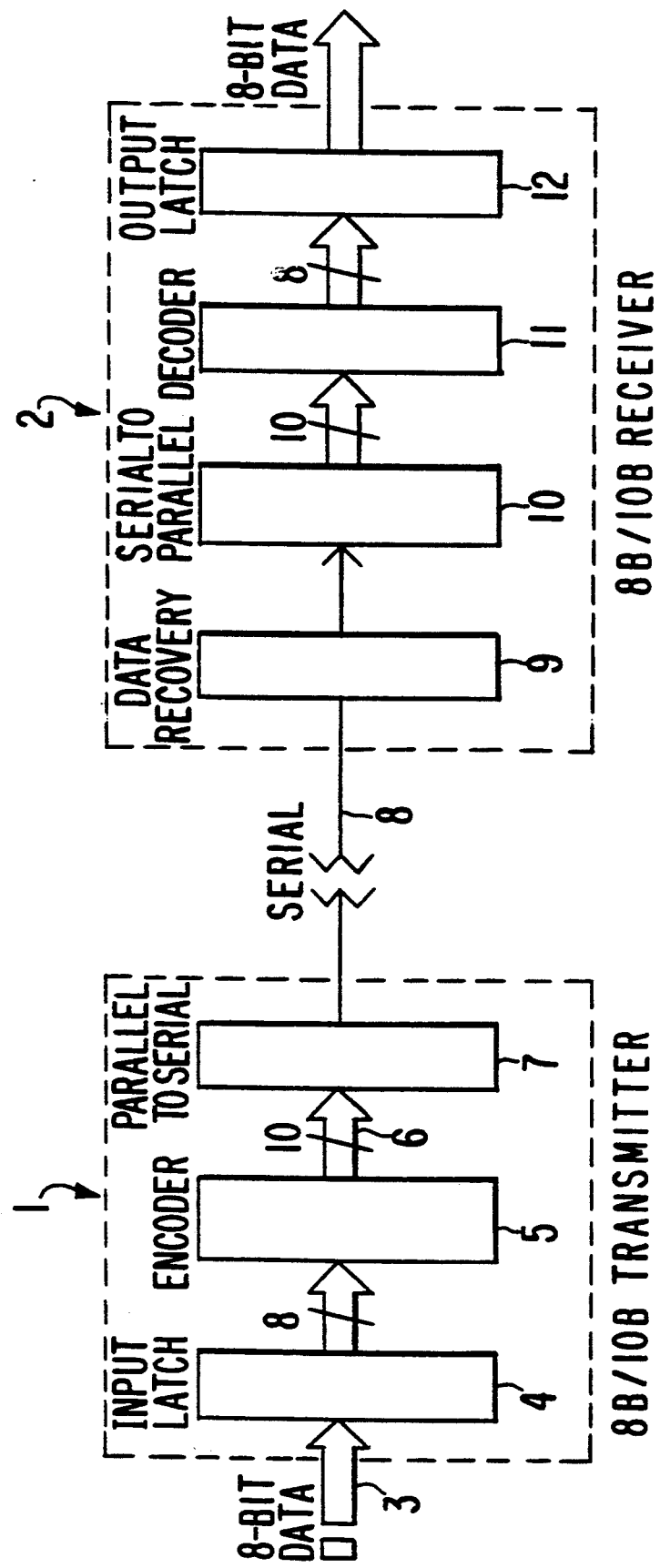
FIG. 1 is a block diagram of an 8 bit wide architecture of the prior art 8B/10B link.

It is our desire to incorporate the desirable features of the 8B/10B code and 8B/10B implementation in a transmission system for our 10B/12B system and to modify both the code and apparatus to implement our new 10B/12B system.

The above discussion described the encoding of raw 8 bit data but did not discuss the special characters used in 8B/10B coding. Special characters are used to establish byte synchronization, mark start and end of packets, and to signal various control functions. 8B/10B code set includes 12 special characters which must comply with the same disparity rules set forth above for the data coding. The Widmer et al article cited above describes the various 8B/10B control codes and their characteristics.

Because no control codes existed heretofore for the 10B/12B coding, we have derived two unique special codes which will not alias and/or concatenate with any other valid code and accordingly can be used as a synchronization word or delimiter. These new codes are:

| | 12 BIT CODE | | ALTERNATE | |
|---|---|---|---|---|
| | abcdei | fghjkl | abcdei | fghjkl |
| First special code | −001111 | 101100+ | +110000 | 010011− |
| Second special code | −001111 | 011100+ | +110000 | 100011− |

It is noted that the first subblock of both of these special codes is K28. K28 is a 5B/6B special code used in the synchronization of 8B/10B code. We have chosen K28 for the first subblock of the 10B/12B code to utilize and take advantage of the same logic for the first subblock as in the 8B/10B code.

We have derived the first special character by choosing the first two bit "fg" of the second portion so that when concatenated to K28 that they will satisfy the 8B/10B singular comma criteria and will avoid run length greater than 5 respectively. To be unique, the entire 12 bit code must not be able to occur as a result of misalignment of the byte boundaries, i.e., aliasing and/or overlap of other valid concatenating code. We have shown that our special codes set forth above cannot occur by aliasing of valid 8B/10B codes.

The analysis below will demonstrate the uniqueness of these special 12 bit codes. Starting with the selected 8 bit comma portion abcdeifg of the special code, as stated above, and inserting $x_1 x_2 x_3 x_4$ for hjkl, i.e., $$a\ b\ c\ d\ e\ i\quad f\ g\ h\ j\ k\ l \qquad (1)$$
$$0\ 0\ 1\ 1\ 1\ 1\quad 1\ 0\ x_1\ x_2\ x_3\ x_4$$

Next, shift (alias) the entire 12 bit code, one bit to the right, resulting in, $$x\ 0\ 0\ 1\ 1\ 1\ 1\ 1\ 0\ x_1\ x_2\ x_3$$

Then, going to Table 1, we write down all valid 5B/6B code from the Table which have 1 1 0 x x x formats for the second nibble. These are:

```
a b c d e i    f g h j k l
+ 0 0 0 1 1 1 +d 1 1 0 0 0 1 d ⎫
- 1 0 0 1 1 1 +d 1 0 1 0 0 0 d ⎬ A
              d 1 1 0 0 1 0 d ⎭

- 1 1 0 1 0 1 + ⎫
              - 1 1 0 0 1 1 + ⎬ B
              - 1 1 0 1 1 0 + ⎭
```

The group B codes cannot appear because they can only be used if the running disparity were negative prior to their use. Since both the possible abcdei result in a positive running disparity, group B cannot occur. Accordingly, $x_1 x_2 x_3 \neq 001, 100, 010$ Next, we shift one more bit to the right resulting in:

```
a b c d e i    f g h j k  l
x x 0 0 1 1    1 1 1 0 x1 x2
```

Again going to Table 1, we write down all valid 5B/6B code from the Table which have the 1 1 1 0 x x format.

These are:

```
a b c d e i      f g h j k l
d 1 0 0 0 1 1 d - 1 1 1 0 0 0 - ⎫
d 0 1 0 0 1 1 d - 1 1 1 0 0 1 + ⎬ C
- 1 1 0 0 1 1 + - 1 1 1 0 1 0 + ⎭
```

Since all of group C is possible, $x_1 x_2 \neq 00, 01, 10$.

The next step is to determine what possibilities for the value of x1 x2 x3 x4 remain. These are:

```
x1 x2 x3 x4 = 1 1 0 0 } F
              1 1 0 1 ⎫
              1 1 1 0 ⎬ D
              1 1 1 1 } E
```

Group D, when concatented with the assumed fg=1 0, result in:

```
1 0 1 1 0 1
1 0 1 1 1 0
```

Both of these codes would have positive disparity and since running disparity is +, these would not be valid. The group E would result in a code 1 0 1 1 1 1 which violates the disparity rule which only permits +2, -2, or 0. Group F would result in an fghjkl code 1 0 1 1 0 0 which has a zero disparity and does not violate any other rule when concatenating with the selected comma portion. Therefore group F needs to be inserted in code (1) above. This analysis demonstrates that the first special code is not able to be formed by aliasing with any other valid data.

The same type of analysis will show that the second special code is also unique and cannot be created by aliasing of valid 5B/6B code.

The code for the 10B/12B implementation includes the 5B/6B code from the prior 8B/10B implementation combined with our new code for the unique first and second special characters. Therefore the 10B/12B code preserves the desirable characteristics of 8B/10B code. It is DC balanced with the same maximum DSV(6), run length (0,4) with an error propagation of 5 bits.

With reference to FIG. 1, the prior art 8 bit wide architecture of both the 8B/10B transmitter 1 and receiver 2 is apparent. Specifically, the prior art latch 4 and encoder 5 of transmitter 1 were configured to accept only 8 bit wide raw data, and the encoder 5 was configured to convert the 8 bit raw data into 10 bit parallel code, which was converted to serial data in shifter 7 and sent over transmission link 8 to the receiver 2. The receiver was also constrained to 8 bit architecture after the decoding of the 10 bit code in decoder 11.

As explained in the Widmer et al article, cited earlier, the 8B/10B transmitter splits the 8 bit raw data into two nibbles, a 5 bit nibble and a 3 bit nibble. Each nibble is sent to a different encoder, respectively a 5B/6B and 3B/4B encoder, after which the encoded 6B and 4B codes are recombined for serial transmission.

Figure 2:
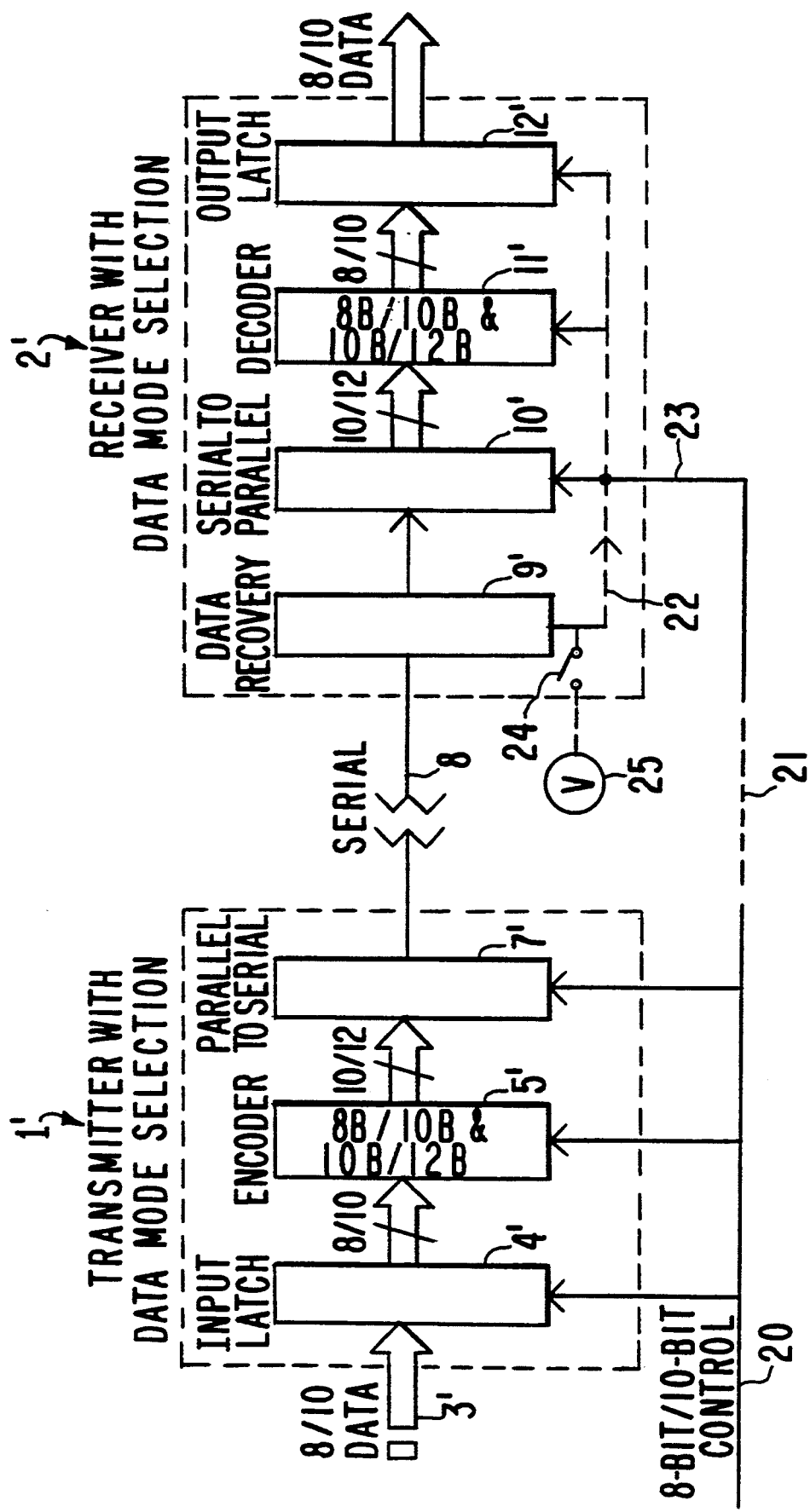
FIG. 2 is a block diagram of the 8B/10B–10B/12B link having selectable 10 bit wide architecture.

With reference to FIG. 2 which is a block diagram of the 10B/12B apparatus of our invention and illustrates the changes which we have made to the communication apparatus to provide a 10B/12B mode and a 8B/10B mode.

With reference to FIG. 2, the incoming raw data 3' is now either 8 bit wide or 10 bit wide, and the latch 4' and encoder 5' and serializer 7', responsive to the 8 bit/10 bit control signal on line 20, are capable of being switched into the 10 bit wide architecture. In this mode, the encoder 5' converts the 10 bit raw data into 12 bit code data and the serializer 7' is modified to clock out 12 bits for each 10 bit raw data word into the link 8 to the receiver 2'.

The receiver 2' is capable of decoding the 10B/12B special characters and accordingly to switch into 10B/12B mode upon receiving a high on the 8 bit/10 bit control line via link 21. Alternately, a circuit in the data recovery block 9' may include a decoder for one of the special 10B/12B codes and upon receipt of such a 10B/12B command, will provide a signal on line 22 to the receiver 8 bit/10 bit control 23 to switch the receiver into the 10B/12B mode. A still further alternative is a manually operable switch 24 in the receiver for selecting the 10B/12B mode by connecting a voltage source 25 to the control line 22.

Figure 3:
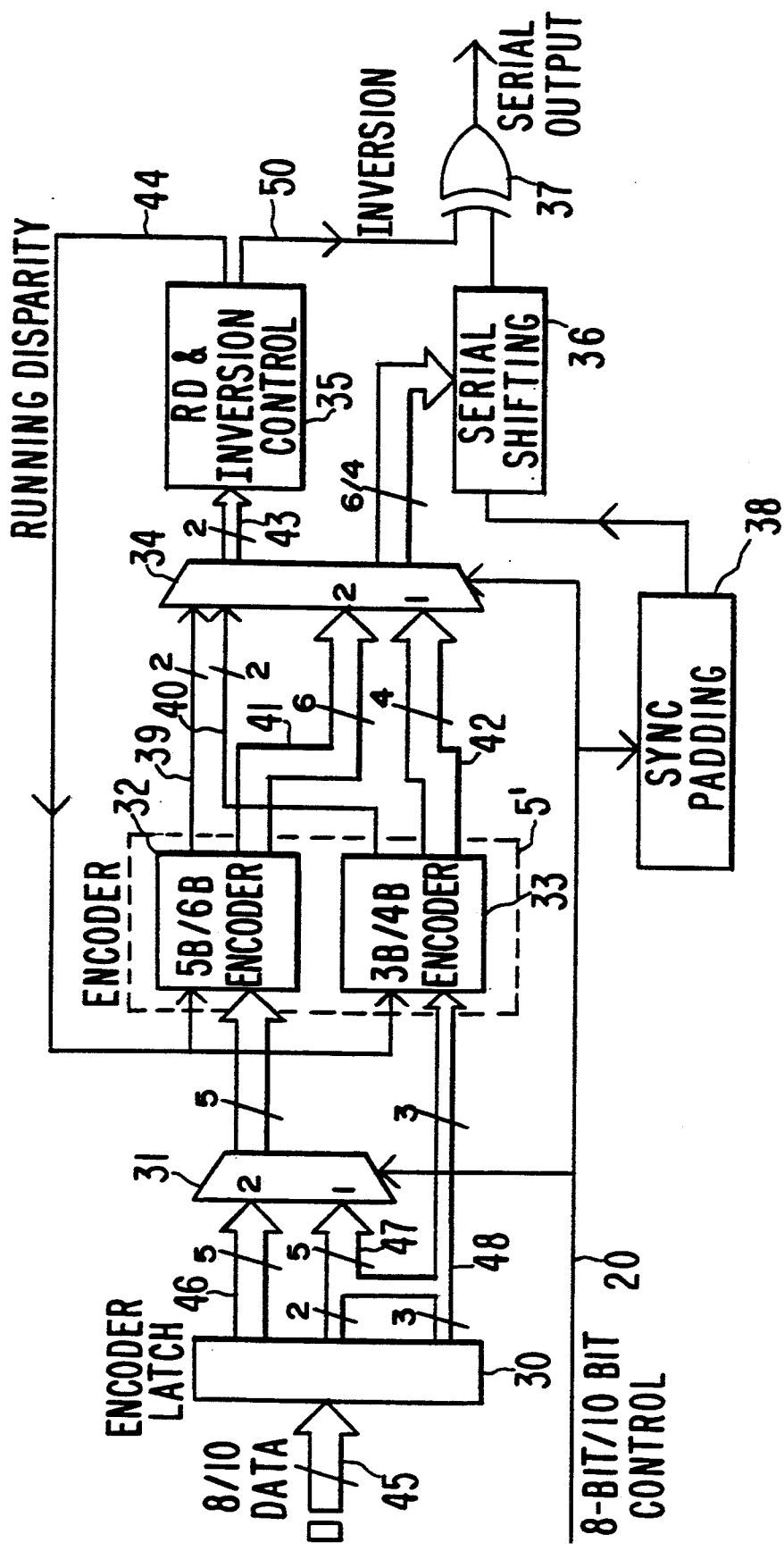
FIG. 3 is a block diagram of the transmitter of our invention.

With reference to FIG. 3, the circuit block diagram showing the architecture of our encoder 5' in transmitter 1' is disclosed. As had been explained earlier, the prior 8B/10B encoder handled the 8 bit input data by alternately sending a 5 bit nibble into the 5B/6B encoder and the remaining 3 bit nibble into the 3B/4B encoder. Responsive to the 8 bit/10 bit control on line 20, we have changed the operation of the encoder so that in the 10 bit mode the multiplexor 31, sends two 5 bit nibbles into the 5B/6B encoder and the 3B/4B encoder section is not used. The 6 bit code output of 5B/6B encoder 32 is sent to multiplexor 34 port 2 where it is transferred to the serial shifter 36. Under 8 bit/10 bit control 20, the multiplexor 34 is locked to port 2 in the 10 bit mode and does not shift to the port 1 input.

Running disparity and inversion control circuit 35 receives a 2 bit input from multiplexor 34. Each of the encoders 32 and 33 calculate the disparity of a nibble, and send this data on line 39 and 40 to circuit 35 to update the running disparity computation of the serial data stream. The running disparity, high or low representing +1 or -1 respectively is sent on line 44 from the running disparity control 35 back to the encoders 32 and 33 for the next byte computation. The other output of the control 35 on line 50 is the inversion control that is sent to the exclusive OR 37 which is in series with the serial shifter 36. Whenever one of the encoders determines that the ALTERNATE code for a certain data nibble is necessary to keep the running disparity within bounds, the inversion signal on line 50 goes high and each bit of the nibble is inverted as it is sent on to the serial link 8. The single exclusive OR circuit 37 following the serial shifter is a simplification of the earlier 8B/10B output which employed an inverter in each of the 10 output line of the encoders 5B/10B and 3B/4B.

In the 10B/12B mode, it is necessary to shift data serially out of the shifter 36 in 12 clock units as opposed to the earlier 10 clock units. Accordingly, the sync padding circuit 38 needs to also receive the 8 bit/10 bit control line to command to shift into the 10B/12B mode and to control the serial shifter 36.

Figure 4:
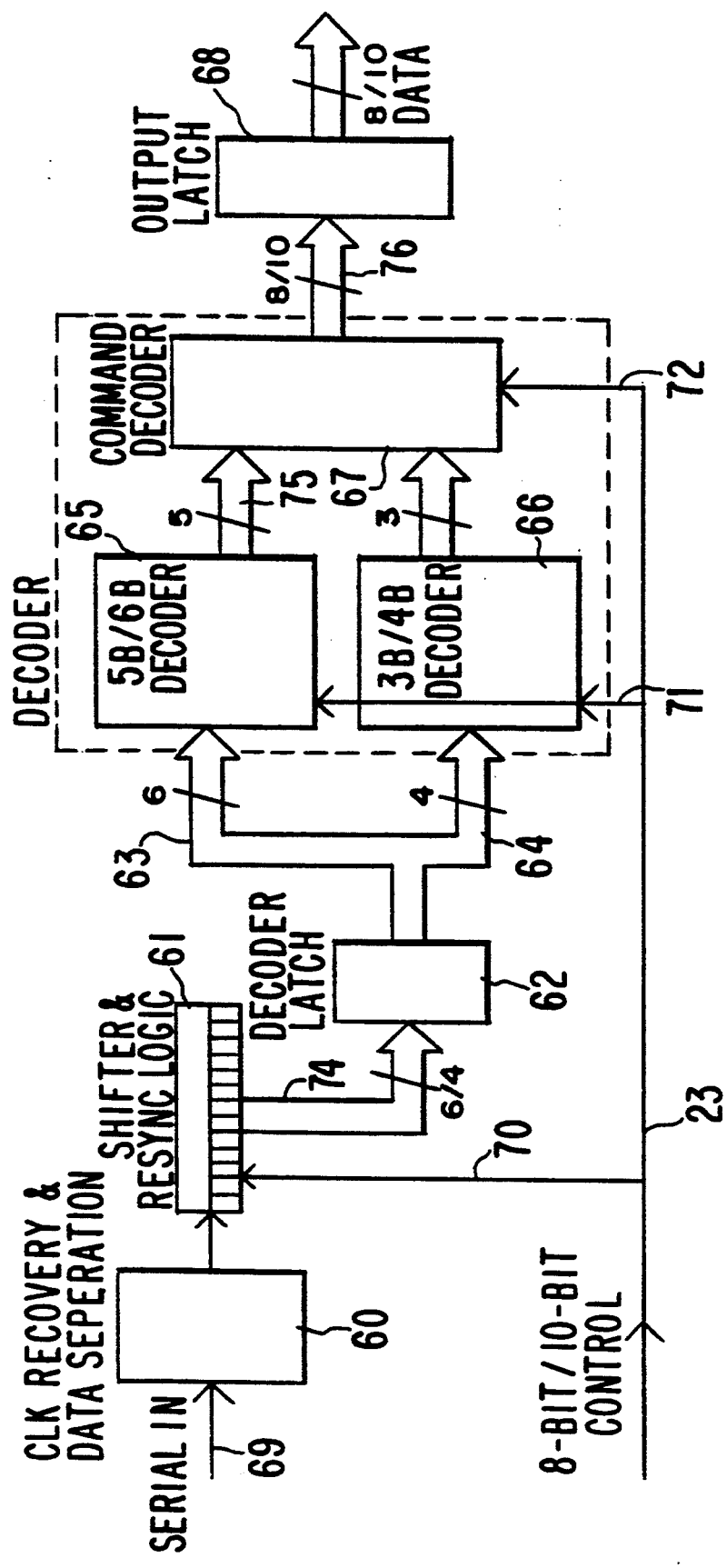
FIG. 4 is a block diagram of the receiver of our invention.

The receiver architecture changes very little from the original 8B/10B receiver in order to enable the 10B/12B mode. Specifically, with reference to FIG. 4, shifter 61 needs to shift 6 bits for each nibble in the 10B/12B mode rather than alternating between 6 bits and 4 bits. In the 8 bit mode, nibbles alternate going into the 5B/6B decoder 65 and 3B/4B decoder 66. In the 10 bit mode, the data goes into the 5B/6B decoder on line 63 one nibble at a time. 5B/6B decoder 65, and command decoder 67 are activated responsible to line 72 so that only the 5B/6B decoder data is forwarded on line 75 to command decoder 67 and then to output latch 68.

The 5B/6B decoder 65 is also modified to include the special codes we designed for 10B/12B control, as explained earlier.

The sync padding command 38, provides in the 10B/12B mode the K28.5 command to the shifter 36. In the event that the shifter 36 is not receiving any data from the encoder 34, the K28.5 command is shifted out by serial shifter 36. In the 10B/12B mode, sync padding commands 38 provides K28.D13/18 command to the shifter 36.

This invention is not intended to be limited to the specific embodiments described hereinabove but rather the scope is to be construed in accordance with our claims.

We claim:

1. A method of coding and transmitting 10 bit data bytes using modified 8B/10B transmission code and a modified 8 bit wide architecture 8B/10B transmitter including:
   providing unique 10B/12B codes and incorporating said unique 10B/12B codes in said 8B/10B transmitter;
   modifying the architecture of said 8B/10B transmitter to permit selective widening of said 8 bit wide architecture in said 8B/10B transmitter to 10 bit wide architecture as an alternative; and
   providing a command control signal to said 8B/10B transmitter to select said 10 bit wide architecture alternative and to select 10B/12B encoding by said 8B/10B transmitter.

2. A method of using an 8B/10B transmitter encoder to encode in the 10B/12B mode comprising
   modifying said 8B/10B transmission code in said encoder to include special unique 10B/12B codes;
   providing a selectable 10B/12B control command signal to said 8B/10B encoder to select said 10B/12B code, and
   responsive to said selectable 10B/12B control command, feeding 10 bit wide data into the 5B/6B encoder by dividing said 10 bit byte into two five bit nibbles and feeding both said 5 bit nibbles to said 5B/6B encoder sequentially.

3. The method of claim 1 wherein said 10B/12B code is comprised of two 5B/6B packets wherein each 5B/6B packet transmission coding is identical to 5B/6B transmission code employed in DC Balanced, Partitioned Block, 8B/10B transmission code except for said unique 10B/12B transmission codes.

4. The method of claim 3 wherein said 10B/12B code includes at least two unique special character transmission codes.

5. The method of claim 4 wherein the first of said at least two special character transmission codes 0 0 1 1 1 1 1 0 1 1 0 0, with an alternate 1 1 0 0 0 0 0 1 0 0 1 1, and wherein said first special character cannot be erroneously decoded due to aliasing.

6. The method of claim 5 wherein said second of at least two special characters is 0 0 1 1 1 1 0 1 1 1 0 0 and alternate 1 1 0 0 0 0 1 0 0 0 1 1 1 and where said second special character cannot be erroneously decoded due to aliasing.

7. A 10B/12B mode transmitter comprising
   (a) an 8B/10B mode transmitter including an 8B/10B encoder logic circuit;
   (b) a multibit encoder latch circuit for storing data to be transmitted in parallel format to said 8B/10B encoder logic circuit, said 8B/10B encoder logic circuit including a 5B/6B portion for encoding the first five bit nibble of an 8 bit byte into 6 bits of coded data and a 3B/4B portion for encoding the remaining three bit nibble portion of said 8 bit byte into 4 bits of coded data;
   (c) first means to transfer, in said 8B/10B mode, said 5 bit nibble from said multibit encoder to said 5B/6B portion of said encoder logic circuit and second means to transfer said 3 bit nibble from said multibit encoder latch to said 3B/4B portion of said encoder logic circuit,
   means to switch said transmitter from said 8B/10B mode to said 10B/12B mode, said switch means including means to cause said first means to transfer said 5 bit nibble to sequentially move both 5 bit nibbles of a 10 bit byte to said 5B/6B portion of said encoder logic circuit.

8. The transmitter of claim 7 wherein said 5B/6B encoder output is coupled to a multiplexor port, and wherein said switch means includes means to cause said multiplexor while it is in 10B/12B mode to accept only said 5B/6B encoder output and to transport said 5B/6B encoder output to a serial shifter.

9. The transmitter of claim 8 wherein the serial shifter is coupled to an output link through an exclusive OR (XOR) circuit.

10. The transmitter of claim 9 wherein said XOR circuit is also coupled at its input to an inverter command signal from a running disparity control circuit, which running disparity control circuit is coupled to said multiplexor.

11. A method of coding, transmitting and receiving 10 bit data bytes using modified 8B/10B transmitter and 8B/10B receiver comprising:
   providing unique 10B/12B special codes, which special codes are not capable of aliasing with any valid 10B/12B coded 12 bit byte;
   modifying the architecture of said 8B/10B transmitter and said 8B/10B receiver to permit selective widening of said 8 bit wide architecture to 10 bit wide architecture as an alternative;

providing a first command control signal to said 8B/10B transmitter to select said 10 bit wide architecture alternative and to select 10B/12B encoding by said 8B/10B encoder; and providing a second command control signal to said 8B/10B receiver to select said 10 bit wide architecture alternative and to select 10B/12B decoding by said 8B/10B receiver.

12. The method of claim 11 wherein said 8B/10B receiver includes an 8B/10B decoder having a 5B/6B decoder portion, wherein said 8B/10B receiver is responsive to said second command control signal for sequentially feeding said 10 bit wide data into the 5B/6B decoder in two five bit nibbles.

* * * * *